US012566089B2

(12) United States Patent        (10) Patent No.: US 12,566,089 B2
Crockett et al.                        (45) Date of Patent: Mar. 3, 2026

(54) STACKED UNIT DETECTION SYSTEM

(71) Applicant: TOSHIBA GLOBAL COMMERCE SOLUTIONS, INC., Durham, NC (US)

(72) Inventors: Timothy W. Crockett, Raleigh, NC (US); Charles M. Kurtz, Jacksonville Beach, FL (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 241 days.

(21) Appl. No.: 18/408,433

(22) Filed: Jan. 9, 2024

(65) Prior Publication Data

US 2025/0224269 A1     Jul. 10, 2025

(51) Int. Cl.
G01G 19/414        (2006.01)
G01D 5/14          (2006.01)
(52) U.S. Cl.
CPC ........... G01G 19/4144 (2013.01); G01D 5/14 (2013.01)
(58) Field of Classification Search
CPC ........................... G06Q 20/208; G07G 1/0018
See application file for complete search history.

(56) References Cited

U.S. PATENT DOCUMENTS

| 12,430,626 | B2* | 9/2025 | Crockett | G06Q 20/208 |
| 2022/0061642 | A1* | 3/2022 | Park | A61B 1/00158 |
| 2023/0089962 | A1* | 3/2023 | Shavit | G06V 40/23 |
| 2024/0330887 | A1* | 10/2024 | Crockett | G06Q 20/208 |

* cited by examiner

*Primary Examiner* — Olusegun Goyea

(74) *Attorney, Agent, or Firm* — Patterson + Sheridan, LLP; Gero G. McClellan

(57)        ABSTRACT

Systems and methods of implementing a detection sequence for determining positions of control boxes within a stack are provided. In one aspect, a system includes control boxes each including a controller having a plurality of ports, a magnetic switch, and a magnet. The control boxes are arranged in a stack so that, for each adjacent pair of control boxes, the magnetic switch of one control box is magnetically coupled with the magnet of another control box. The controller of each control box is configured to determine a position, within the stack, of its associated control box based at least in part on the magnetic coupling, or lack of magnetic coupling, between the magnetic switch of its associated control box and the magnet of another control box within the stack.

20 Claims, 7 Drawing Sheets

STACKED UNIT DETECTION SYSTEM

BACKGROUND

Checkout terminals enable customers to checkout and pay for products. Some checkout terminals can include a scale that allows for price-by-weight items to be weighed. The scale can include a plurality of load cells that can each convert a sensed force into a measurable electrical output. Electrical outputs from the load cells can be used to determine the weight of a price-by-weight item placed on the scale, which in turn allows for the actual price of the item to be determined. Electrical outputs from the load cells can also be used for other reasons, such as confirming that an item has been placed in a bag after being scanned.

DETAILED DESCRIPTION

Some checkout terminals can include a scale that allows for price-by-weight items to be weighed. The scale can include a plurality of load cells that can each convert a sensed force into a measurable electrical output. Electrical outputs from the load cells can be used to determine the weight of a price-by-weight item placed on the scale, which in turn allows for the actual price of the item to be determined. Some checkout terminals can include multiple controllers each having a plurality of ports, with each port being communicatively coupled with one of the load cells. In some instances, the controllers can be coupled with the wrong load cells or set of load cells during assembly. When the load cells are coupled with the wrong controller, the scale can be inaccurate or inoperable.

A checkout terminal is disclosed herein that includes features that enable controllers arranged in a vertical stack to detect their respective positions within the vertical stack (e.g., as top box, bottom box, middle box, etc.) so that the ports of each controller can be configured to the correct set of load cells. In at least one example, based on the magnetic coupling of a magnet of one control box with a magnetic switch of a neighboring control box, a controller of a control box can determine a position of its associated control box within the vertical stack. In some embodiments, the magnet can be a permanent magnet, in which case the magnetic switch of a neighboring control box is configured to detect the presence of a magnetic field produced by the permanent magnet. In other embodiments, the magnet can be an electromagnet, in which case the magnetic switch of a neighboring control box can detect a predetermined pulse pattern with which the electromagnet is pulsed. For at least one control box of a vertical stack, a controller can determine the position of its control box based on the lack of magnetic coupling with its associated magnetic switch, e.g., because the control box is a top or bottom control box in the vertical stack. With the unique detection features of the control boxes of the present disclosure, the position of the control boxes within a vertical stack can be detected and used to configure the ports of the controllers to match to their respective load cells to which they are coupled, even if the controllers are assembled out of their predetermined order.

Figure 1:
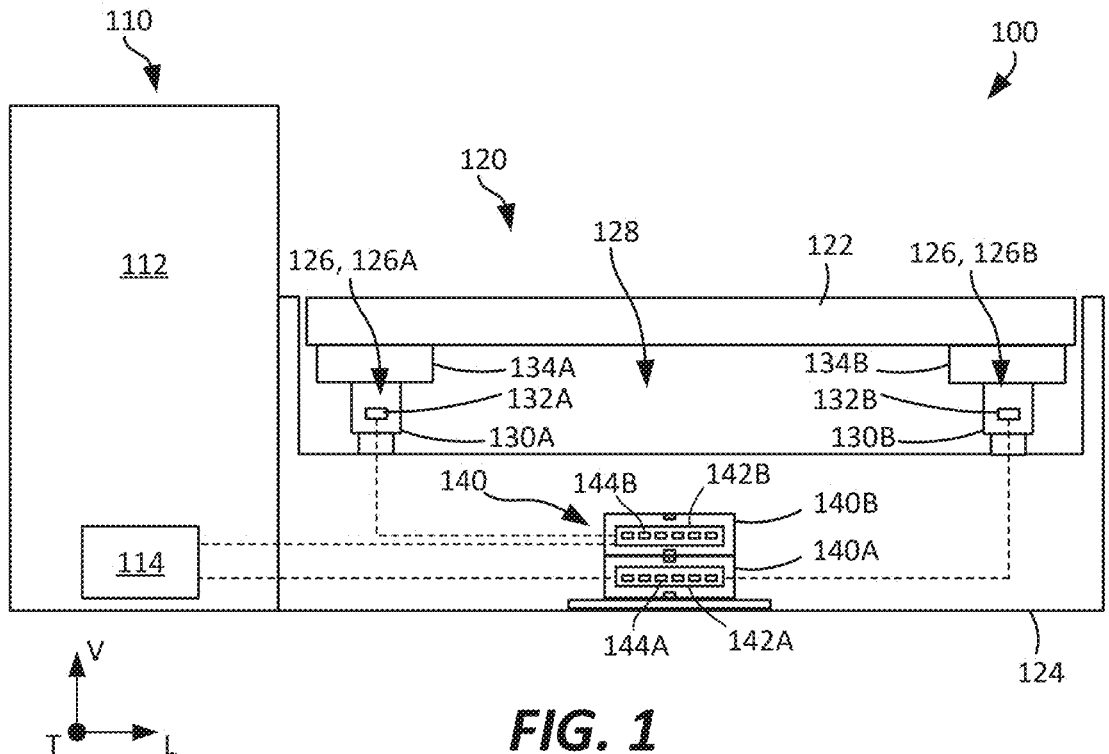
FIG. 1 illustrates one embodiment of a checkout terminal in accordance with various aspects as described herein.

With reference now to the figures, FIG. 1 illustrates a schematic cross-sectional view of a checkout terminal 100. The checkout terminal 100 can be used to complete a Point of Sale (POS) transaction, for example. For reference, the checkout terminal 100 defines a vertical direction V, a lateral direction L, and a traverse direction T (going into and out of the page in FIG. 1). The vertical direction V, the lateral direction L, and the traverse direction T are mutually perpendicular to one another and form an orthogonal direction system.

As shown in FIG. 1, the checkout terminal 100 includes a core unit 110 and a scale unit 120. The core unit 110 can include a settlement terminal 112 that includes, among other components, a barcode scanner, receipt issuer, touch panel, card reader, bill reader, coin reader, and the like that enable a POS transaction to be completed. The settlement terminal 112 can include a computing device 114 or host computer. The computing device 114 functions to control various operations of the settlement terminal 112, such as corresponding a price per unit with a measured weight of a price-by-weight item to determine an actual cost of the item. The computing device 114 includes one or more processors, one or more memory devices (e.g., one or more non-transitory memory devices), and a communications interface operable to transmit and/or receive transmissions, such as sensor outputs, control signals, etc. The one or more memory devices can include instructions, such as computer-readable instructions, and data that are stored thereon. When the instructions are executed by the one or more processors, the one or more processors can be caused to perform an operation, such as any of the operations disclosed herein.

The scale unit 120 functions generally to weigh items, such as grocery items, e.g., so that the parties to a transaction can understand the actual price for the item (or "price-by-weight" item) placed on the scale unit 120. The scale unit 120 includes a platen 122 or load plate, a cabinet 124, and a plurality of load assemblies 126. The cabinet 124 defines an interior 128 or recess in which the load assemblies 126 are arranged. For this example embodiment, the scale unit 120 includes twelve (12) load assemblies 126 but two (2) load assemblies are depicted in FIG. 1, including a first load assembly 126A and a second load assembly 126B spaced from the first load assembly 126A, e.g., along the lateral direction L. In other embodiments, the scale unit 120 can include more or less than twelve (12) load assemblies. The platen 122 can be coupled with the load assemblies 126, such as by mechanical fasteners.

Each load assembly 126 includes a scale having a load cell. For instance, the first load assembly 126A includes a first scale 130A having a first load cell 132A, or first force sensor. The first load cell 132A can be positioned on top of the first scale 130A or embedded therein. A first support bracket 134A is mounted to the first scale 130A. The first support bracket 134A can be used to couple the platen 122 with the first scale 130A. Likewise, the second load assembly 126B includes a second scale 130B having a second load cell 132B, or second force sensor. The second load cell 132B can be positioned on top of the second scale 130B or embedded therein. A second support bracket 134B is mounted to the second scale 130B. The second support bracket 134B can be used to couple the platen 122 with the second scale 130B. The other load assemblies can be configured in a same or similar manner as the first and second load assemblies 126A, 126B.

Figure 2:
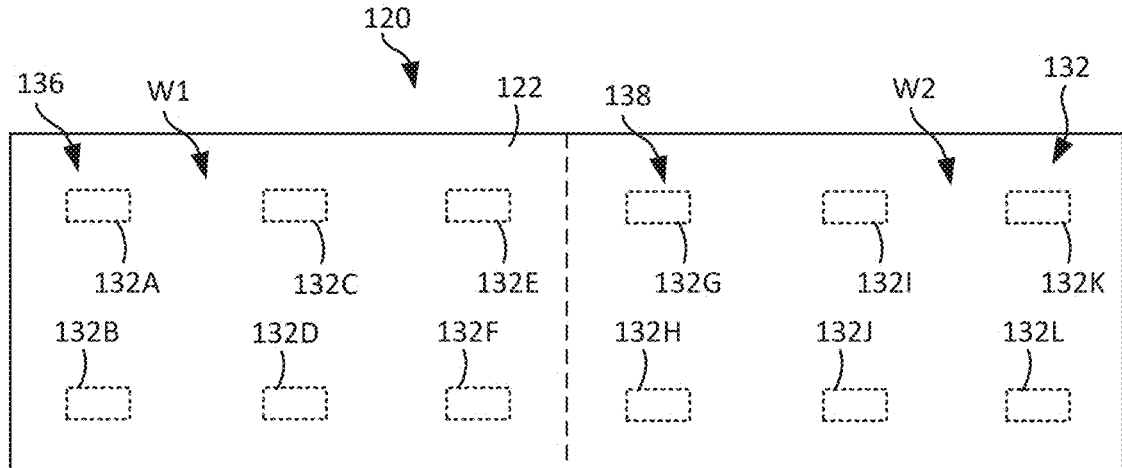
FIG. 2 is a schematic top view of a scale unit of the checkout terminal of FIG. 1 and depicts load cells arranged relative to a platen.
Figure 2:
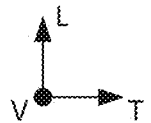

FIG. 2 is a schematic top plan view of the scale unit 120 and depicts an example arrangement of the load cells, or collectively load cells 132, of the respective load assemblies 126 (FIG. 1) arranged relative to the platen 122. As shown, the scale unit 120 defines a first weight zone W1 and a second weight zone W2 (demarcated by the dashed line). A first set 136 of the load cells 132 are associated with the first weight zone W1 and a second set 138 of the load cells 132 are associated with the second weight zone W2. In at least one example, the first set 136 of load cells associated with the first weight zone W1 includes the first load cell 132A, the second load cell 132B, a third load cell 132C, a fourth load cell 132D, a fifth load cell 132E, and a sixth load cell 132F. The second set 138 of load cells associated with the second weight zone W2 includes a seventh load cell 132G, an eighth load cell 132H, a ninth load cell 132I, a tenth load cell 132J, an eleventh load cell 132K, and a twelfth load cell 132L. Although two (2) weight zones are shown in FIG. 2, the scale unit 120 can define more than two (2) weight zones in other example embodiments.

With reference now to FIGS. 1 and 2, the scale unit 120 can also include a plurality of control boxes, collectively control boxes 140. In FIG. 1, the scale unit 120 includes two (2) control boxes, including a first control box 140A and a second control box 140B. However, in other embodiments, the scale unit 120 can include more than two (2) control boxes. The control boxes 140 can be vertically stacked as shown in FIG. 1. In the example of FIG. 1, the second control box 140B is stacked vertically on top of the first control box 140A. However, in some instances, the first control box 140A can be stacked vertically on top of the second control box 140B.

Each one of the control boxes 140 can include a controller having a plurality of ports. The ports of the control boxes 140 can be configured to receive a respective communication line from one of the load cells 132. For the depicted embodiment of FIG. 1, the first control box 140A includes a first controller 142A having a plurality of first ports 144A and the second control box 140B includes a second controller 142B having a plurality of second ports 144B. The first controller 142A includes six (6) first ports and the second control box 140B includes six (6) second ports. The first controller 142A and/or second controller 142B can have other numbers of ports in other embodiments. The first and second ports 144A, 144B can be Universal Serial Bus (USB) ports, for example. The first ports 144A of the first controller 142A can receive respective communication lines from the load cells 132A-132F of the first set 136 and the second ports 144B of the second controller 142B can receive respective communication lines from the load cells 132G-132L of the second set 138. In this regard, the first controller 142A is associated with load cells 132A-132F and the second controller 142B is associated with load cells 132G-132L.

To ensure that the controllers of the vertical stack are associated with the proper load cells, or set of load cells, the control boxes 140 can include features that enable detection of the positions of the control boxes 140, or controllers thereof, within the vertical stack of control boxes. Accordingly, the checkout terminal 100 can include a stacked unit detection system. Detecting a position of a control box within the vertical stack (e.g., as top box, bottom box, middle box, etc.) can ensure that each controller of the vertical stack is configured to the correct set of load cells. In at least one example, the first and second controllers 142A, 142B can have different USB Product IDs (PIDs), or USB PIDs, and by detecting the positions of the controllers within the vertical stack, the ports of the controllers can be configured with the USB PID associated with the correct set of load cells. In this way, even if the controllers are assembled out of their predetermined order, the position of the controllers can be detected and used to configure the controllers with the USB PID that matches the load cells to which they are coupled.

Figure 3:
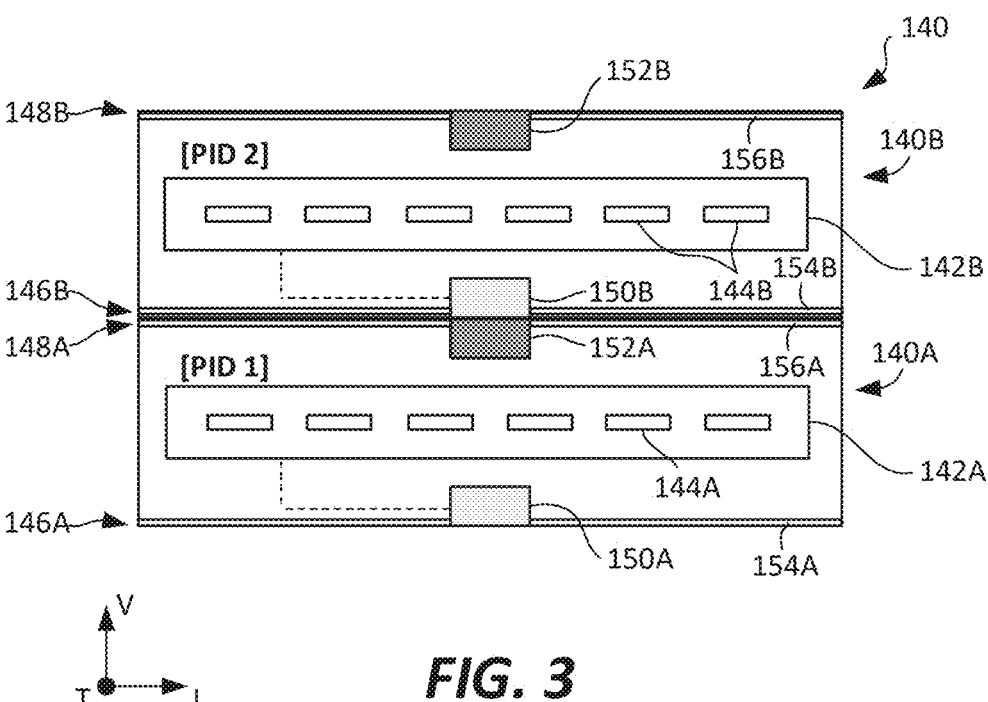
FIGS. 3 through 5 are schematic views of various example embodiments of control boxes arranged in vertical stacks.

FIG. 3 is a close-up, schematic view of one example vertically stacked arrangement of the control boxes 140. In the example of FIG. 3, the second control box 140B is shown stacked on top of the first control box 140A. As shown, each control box 140 has a magnetic switch disposed at its first end (e.g. its bottom end) and a magnet disposed at its second end (e.g., its top end).

In at least one example, the first control box 140A has a first end 146A and a second end 148A. In this example embodiment, the first end 146A is a bottom end of the first control box 140A and the second end 148A is a top end of the first control box 140A. The first control box 140A includes the first controller 142A having a plurality of first ports 144A (e.g., USB ports), a first magnetic switch 150A disposed at the first end 146A, and a first magnet 152A disposed at the second end 148A. The first controller 142A is coupled with the first magnetic switch 150A and can determine a position of the first control box 140A within the vertical stack based on whether the first magnetic switch 150A is exposed to a magnetic field, e.g., produced by a magnet of a neighboring control box positioned below the first control box 140A. For example, during a detection sequence, when the first magnetic switch 150A is exposed to a magnetic field, the first magnetic switch 150A can "close" to allow electric current to flow through a detection circuit, which can indicate to the first controller 142A that the first control box 140A is not the bottom box of the vertical stack. When the first magnetic switch 150A is not exposed to a magnetic field during a detection sequence, the first magnetic switch 150A simply remains "open", preventing the flow of electric current through the detection circuit, which can indicate to the first controller 142A that the first control box 140A is in fact the bottom box of the vertical stack.

Likewise, the second control box 140B has a first end 146B and a second end 148B. In this example embodiment, the first end 146B is a bottom end of the second control box 140B and the second end 148B is a top end of the second control box 140B. The second control box 140B includes the second controller 142B having the plurality of second ports 144B (e.g., USB ports), a second magnetic switch 150B disposed at the first end 146B, and a second magnet 152B disposed at the second end 148B. The second controller 142B is coupled with the second magnetic switch 150B and can determine a position of the second control box 140B within the vertical stack based on whether the second magnetic switch 150B is exposed to a magnetic field, e.g., produced by a magnet of a neighboring control box positioned below the second control box 140B. For example, during a detection sequence, when the second magnetic switch 150B is exposed to a magnetic field, the second magnetic switch 150B can "close" to allow electric current to flow through a detection circuit, which can indicate to the second controller 142B that the second control box 140B is not the bottom box of the vertical stack. When the second magnetic switch 150B is not exposed to a magnetic field during a detection sequence, the second magnetic switch 150B simply remains "open", preventing the flow of electric current through the detection circuit, which can indicate to the second controller 142B that the second control box 140B is in fact the bottom box of the vertical stack.

Each adjacent pair of control boxes 140 can be interlocked so that the magnet of one box is aligned with the magnetic switch of an adjacent box of the plurality of control boxes. For instance, the first control box 140A can include a female interlock feature 154A at its first end 146A (e.g., a dovetail slot) and a male interlock feature 156A at its second end 148A (e.g., a dovetail). The second control box 140B can likewise include a female interlock feature 154B at its first end 146B (e.g., a dovetail slot) and a male interlock feature 156B at its second end 148B (e.g., a dovetail). The first control box 140A and the second control box 140B can be interlocked by mating the male interlock feature 156A of the first control box 140A with the female interlock feature 154B of the second control box 140B (e.g., by sliding the dovetail of the first control box 140A into the dovetail slot of the second control box 140B). Such mechanical interlock features can ensure proper alignment of the magnet and magnetic switch of neighboring control boxes. Other types of interlocking features are contemplated, such as key/ keyways and the like.

In implementing a detection sequence for the vertical stack of FIG. 3, which can be commenced by the first controller 142A, the second controller 142B, or some other computing device (e.g., the computing device 114 of FIG. 1), the first controller 142A and the second controller 142B can determine their respective positions within the vertical stack. For instance, the first controller 142A can determine or receive an input indicating that the first magnetic switch 150A is not in the presence of a magnetic field, and accordingly, the first controller 142A can determine that the first control box 140A is the bottom control box of the vertical stack. The second controller 142B can determine or receive an input indicating that the second magnetic switch 150B is in the presence of a magnetic field (e.g., produced by the first magnet 152A of the first control box 140A), and accordingly, the second controller 142B can determine that the second control box 140B is not the bottom control box of the vertical stack, and if there are two (2) control boxes in the vertical stack as in the embodiment of FIG. 3, the second controller 142B can determine that the second control box 140B is the top box in the vertical stack. Alternatively, once the first control box 140A determines that itself as the bottom box of the vertical stack, this determination can be communicated to the second controller 142B (e.g., by way of the computing device 114 of FIG. 1 or via direct communication between the first and second controllers 142A, 142B), and by inference, the second controller 142B can determine that the second control box 140B is not the bottom box of the vertical stack (and that the second control box 140B is the top box when there are two control boxes in the vertical stack).

If the first control box 140A was stacked on top of the second control box 140B, in implementing the detection sequence, the second controller 142B can determine or receive an input indicating that the second magnetic switch 150B is not in the presence of a magnetic field, and accordingly, the second controller 142B can determine that the second control box 140B is the bottom control box of the vertical stack. The first controller 142A can determine or receive an input indicating that the first magnetic switch 150A is in the presence of a magnetic field (e.g., produced by the second magnet 152B of the second control box 140B), and accordingly, the first controller 142A can determine that the first control box 140A is not the bottom control box of the vertical stack, and if there are two (2) control boxes in the vertical stack, the first controller 142A can determine that the first control box 140A is the top box in the vertical stack.

Once the positions of the control boxes within the vertical stack are determined, the first and second controllers 142A, 142B can be configured. For example, one or both of the first and second controllers 142A, 142B can self-configure or one or both of the first and second controllers 142A, 142B can be configured by another computing device, such as computing device 114 of FIG. 1. For instance, when the second control box 140B is stacked on top of the first control box 140A as in FIG. 3, the first controller 142A can be configured with a first PID associated with load cells 132A-138F, or rather, the first set 136 of load cells, and, the second controller 142B can be configured with a second PID associated with load cells 132G-138L, or rather, the second set 138 of load cells. In contrast, when the first control box 140A is stacked on top of the second control box 140B, the second controller 142B can be configured with the first PID associated with load cells 132A-138F, or rather, the first set 136 of load cells, and, the first controller 142A can be configured with the second PID associated with load cells 132G-138L, or rather, the second set 138 of load cells. In this way, regardless of the stacked arrangement of the first and second control boxes 140A, 140B, the first and second controllers 142A, 142B can be configured with the PID associated with the correct set of load cells.

In some example embodiments, the control boxes of a vertical stack can each have a magnet at their respective first ends (e.g., bottom ends) and a magnetic switch at their respective second ends (e.g., top ends). An example embodiment is provided below.

Figure 4:
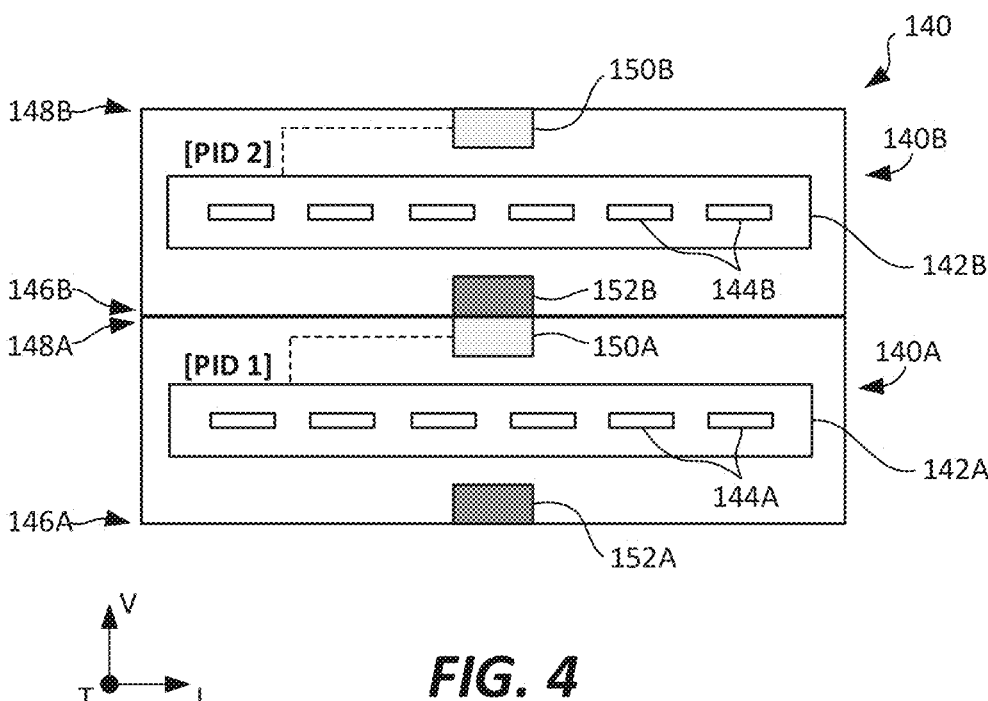

FIG. 4 is a schematic view of another example embodiment of a vertically stacked arrangement of control boxes. For the depicted embodiment of FIG. 4, the second control box 140B is stacked on top of the first control box 140A. Unlike the embodiment of FIG. 3, the first control box 140A includes the first magnet 152A at its first end 146A (or bottom end) and the first magnetic switch 150A at its second end 148A (or top end). Similarly, the second control box 140B includes the second magnet 152B at its first end 146B (or bottom end) and the second magnetic switch 150B at its second end 148B (or top end).

For the depicted embodiment of FIG. 4, the first and second controllers 142A, 142B can determine the positions of their respective control boxes 140A, 140B in a similar manner as described above with respect to FIG. 3. In at least one example, in implementing a detection sequence, the second controller 142B can determine or receive an input indicating that the second magnetic switch 150B is not in the presence of a magnetic field, and accordingly, the second controller 142B can determine that the second control box 140B is the top control box of the vertical stack. The first controller 142A can determine or receive an input indicating that the first magnetic switch 150A is in the presence of a magnetic field (e.g., produced by the second magnet 152B of the second control box 140B), and accordingly, the first controller 142A can determine that the first control box 140A is not the top control box of the vertical stack, and if there are two (2) control boxes in the vertical stack, the first controller 142A can determine that the first control box 140A is the bottom box in the vertical stack. Once the positions of the control boxes within the vertical stack are determined, the first and second controllers 142A, 142B can be configured as described above.

In some further embodiments, the control boxes of a vertical stack can each have a magnetic switch at their respective first ends (e.g., bottom ends) and a magnet in the form of an electromagnet at their respective second ends (e.g., top ends). An example embodiment is provided below.

Figures 5, 6:
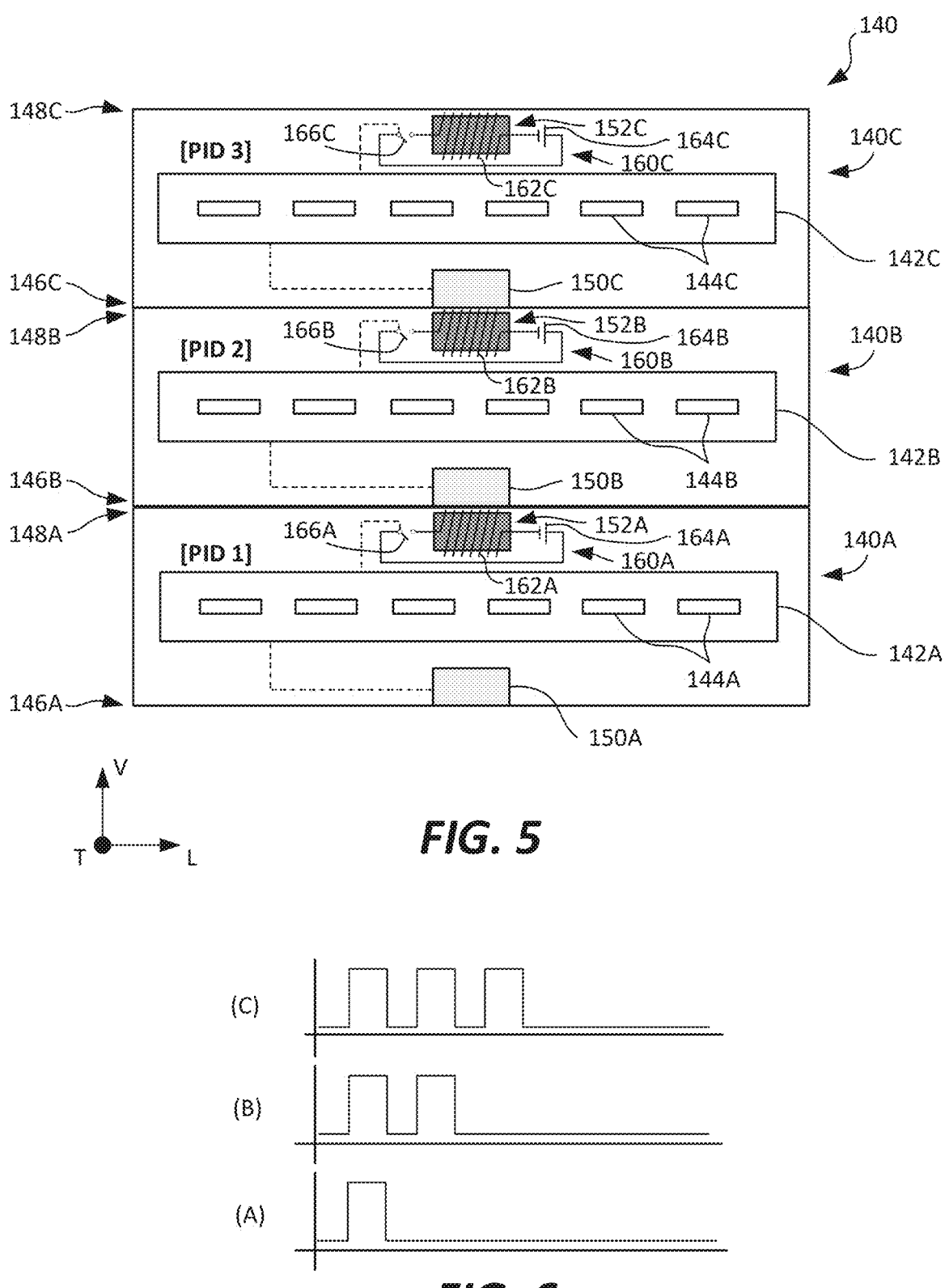
FIG. 6 is a graph depicting example duty cycles that can be implemented during a detection sequence.

FIG. 5 is a schematic view of another example embodiment of a vertically stacked arrangement of control boxes. For the depicted embodiment of FIG. 5, the second control box 140B is stacked on top of the first control box 140A and a third control box 140C is stacked on top of the second control box 140B. The third control box 140C includes a third controller 142C having a plurality of third ports 144C. The third controller 142C includes six (6) third ports but can have more or less than six (6) ports in other embodiments. The third ports 144C can be USB ports, for example. The third ports 144C of the third controller 142C can receive respective communication lines from load cells, e.g., from a set of load cells from associated with another weight zone.

The third control box 140C has a first end 146C (e.g., a bottom end) and a second end 148C (e.g., a top end). The third control box 140C also includes a third magnetic switch 150C at its first end 146C and a third magnet 152C at its second end 148C. The first magnet 152A, the second magnet 152B, and the third magnet 152C of the first, second, and third control boxes 140A, 140B, 140C, respectively, are each electromagnets. For the depicted embodiment of FIG. 5, each electromagnet includes a core and a coil arranged around the core. The coil of a given electromagnet can be a component of a pulse circuit of a given control box.

For instance, the first magnet 152A, or first electromagnet, can include a first coil 162A arranged around a first core. The first coil 162A is arranged along a first pulse circuit 160A. The first pulse circuit 160A includes the first coil 162A, a first power source 164A, and a first controllable device, such a first controllable switch 166A. The first controllable switch 166A, or a driver thereof, can be communicatively coupled with the first controller 142A, e.g., to one or more processors thereof. During a detection sequence, the first controller 142A can cause the first controllable switch 166A to modulate according to a duty cycle, e.g., so that electric current can be pulsed from the first power source 164A to the first coil 162A. When electric current is pulsed to the first coil 162A, a magnetic field can be produced.

The second and third magnets 152B, 152C, or second and third electromagnets, can be configured in a similar manner as the first magnet 152A, or first electromagnet. In at least one example, the second magnet 152B, or second electromagnet, can include a second coil 162B arranged around a second core. The second coil 162B is arranged along a second pulse circuit 160B. The second pulse circuit 160B includes the second coil 162B, a second power source 164B, and a second controllable device, such a second controllable switch 166B. The second controllable switch 166B, or a driver thereof, can be communicatively coupled with the second controller 142B, e.g., to one or more processors thereof. During a detection sequence, the second controller 142B can cause the second controllable switch 166B to modulate according to a duty cycle, e.g., so that electric current can be pulsed from the second power source 164B to the second coil 162B. When electric current is pulsed to the second coil 162B, a magnetic field can be produced.

Similarly, the third magnet 152C, or third electromagnet, can include a third coil 162C arranged around a third core. The third coil 162C is arranged along a third pulse circuit 160C. The third pulse circuit 160C includes the third coil 162C, a third power source 164C, and a third controllable device, such a third controllable switch 166C. The third controllable switch 166C, or a driver thereof, can be communicatively coupled with the third controller 142C, e.g., to one or more processors thereof. During a detection sequence, the third controller 142C can cause the third controllable switch 166C to modulate according to a duty cycle, e.g., so that electric current can be pulsed from the third power source 164C to the third coil 162C. When electric current is pulsed to the third coil 162C, a magnetic field can be produced.

In implementing a detection sequence for the vertical stack of FIG. 5, which can be commenced by the first controller 142A, the second controller 142B, the third controller 142C, or some other computing device (e.g., the computing device 114 of FIG. 1), the first, second, and third controllers 142A, 142B, 142C can determine their respective positions within the vertical stack.

For instance, the first controller 142A can determine or receive an input indicating that the first magnetic switch 150A is not in the presence of a magnetic field, and accordingly, the first controller 142A can determine that the first control box 140A is the bottom control box of the vertical stack. As a result, the first controller 142A can cause the first magnet 152A to be pulsed according to a first duty cycle, with the first duty cycle being associated with a bottom box of the vertical stack. In at least one example, the first controller 142A can control the first controllable switch 166A to modulate according to the first duty cycle so that electric current can be pulsed from the first power source 164A to the first coil 162A of the first magnet 152A. An example first duty cycle is shown in graph (A) of FIG. 6. The first duty cycle includes a predetermined number of pulses for a predetermined time period, e.g., 1 pulse every 1 second.

The magnetic field produced by the pulsing of the first magnet 152A according to the first duty cycle can be sensed by the second magnetic switch 150B of the second control box 140B. The second controller 142B can determine or receive an input indicating that the second magnetic switch 150B is in the presence of a magnetic field (e.g., produced by the first magnet 152A of the first control box 140A), or rather, a pulsed magnetic flux. The second controller 142B can recognize or identify the pulse pattern (the first pulse pattern in this example) used to pulse the magnet (the first magnet 152A in this example) magnetically coupled with the second magnetic switch 150B. Based on the identified pulse pattern, the second controller 142B can determine that the second control box 140B is the second box from the bottom of the vertical stack.

Once the second controller 142B determines that the second control box 140B is the second box from the bottom of the vertical stack, the second controller 142B can cause the second magnet 152B to be pulsed according to a second duty cycle, with the second duty cycle being associated with a box that is second from the bottom of the vertical stack (or the box stacked directly on top of the bottom box). In at least one example, the second controller 142B can control the second controllable switch 166B to modulate according to the second duty cycle so that electric current can be pulsed from the second power source 164B to the second coil 162B of the second magnet 152B. An example second duty cycle is shown in graph (B) of FIG. 6. The second duty cycle includes a predetermined number of pulses for a predetermined time period, e.g., 2 pulses every 1 second.

The magnetic field produced by the pulsing of the second magnet 152B can be sensed by the third magnetic switch 150C of the third control box 140C. The third controller 142C can determine or receive an input indicating that the third magnetic switch 150C is in the presence of a magnetic field (e.g., produced by the second magnet 152B of the second control box 140B), or rather, a pulsed magnetic flux. The third controller 142C can recognize or identify the pulse pattern (the second pulse pattern in this example) used to pulse the magnet (the second magnet 152B in this example) magnetically coupled with the third magnetic switch 150C. Based on the identified pulse pattern, the third controller 142C can determine that the third control box 140C is the third box from the bottom of the vertical stack.

If the number of boxes in the vertical stack is unknown to the controllers of the control boxes 140, the third controller 142C can cause the third magnet 152C to be pulsed according to a third duty cycle, with the third duty cycle being associated with a box that is second from the bottom of the vertical stack. In at least one example, the third controller 142C can control the third controllable switch 166C to modulate according to the third duty cycle so that electric current can be pulsed from the third power source 164C to the third coil 162C of the third magnet 152C. An example third duty cycle is shown in graph (C) of FIG. 6. The third duty cycle includes a predetermined number of pulses for a predetermined time period, e.g., 3 pulses every 1 second. In the depicted embodiment of FIG. 5, there is no control box stacked on the third control box 140C; thus, the magnetic field produced by pulsing the third magnet 152C is not sensed by a magnetic switch of a neighboring control box stacked thereon. If the number of boxes in the vertical stack is known to the controllers of the control boxes 140, then the third magnet 152C does not have to be pulsed.

In accordance with the embodiment of FIG. 5, the position of a control box within the vertical stack is determined based on the identifying pattern from the box below (except for the bottom box of the vertical stack because the magnetic switch of the bottom box is not in the presence of a magnetic field produced by a neighboring control box). As one example, in the depicted embodiment of FIG. 5, the second controller 142B identifies the pulse pattern used to pulse the first magnet 152A magnetically coupled with the second magnetic switch 150B as the first pulse pattern, which indicates to the second controller 142B that the control box below is the bottom box of the vertical stack and that the second control box 140B is the second box from the bottom of the vertical stack. Similarly, the third controller 142C identifies the pulse pattern used to pulse the second magnet 152B magnetically coupled with the third magnetic switch 150C as the second pulse pattern, which indicates to the third controller 142C that the control box below is the second box from the bottom of the vertical stack and that the third control box 140C is the third box from the bottom of the vertical stack (or when it is known that three (3) boxes are in the vertical stack, the third controller 142C can determine that the third control box 140C is the top box in the vertical stack).

Once the positions of the control boxes of the vertical stack are known, the first, second, and third control boxes 140A, 140B, 140C can be configured, e.g., with first, second, and third product IDs (PID1, PID2, PID3), e.g., so that the first, second, and third ports 144A, 144B, 144C of the first, second, and third control boxes 140A, 140B, 140C can be assigned to the correct load cells or sets of load cells. No matter the arrangement of the control boxes in the vertical stack, the bottom box of the vertical stack can be assigned PID1, the middle box can be assigned PID2, and the top box can be assigned PID3. So, for example, if the second control box 140B was arranged as the bottom box, the third control box 140C was arranged as the middle box, and the first control box 140A was arranged as the top box, then the second control box 140B would be assigned PID1, the third control box 140C would be assigned PID2, and the first control box 140A would be assigned PID3.

The aspects of FIG. 5 also apply to vertical stacks having two boxes as well as vertical stacks having more than three (3) control boxes.

Further, in some alternative embodiments, the control boxes of a vertical stack can be configured as in FIG. 5 except each control box can have a magnet in the form of an electromagnet at their respective first ends (or bottom ends) and a magnetic switch at their respective second ends (or top ends).

In some further embodiments, the control boxes of a vertical stack can each have 1) a magnetic switch and a magnet in the form of an electromagnet at their respective first ends (e.g., bottom ends); and 2) a magnetic switch and a magnet in the form of an electromagnet at their respective second ends (e.g., top ends). Such an embodiment allows for both top-down and bottom-up communication between the control boxes of the vertical stack. An example embodiment is provided below.

Figure 7:
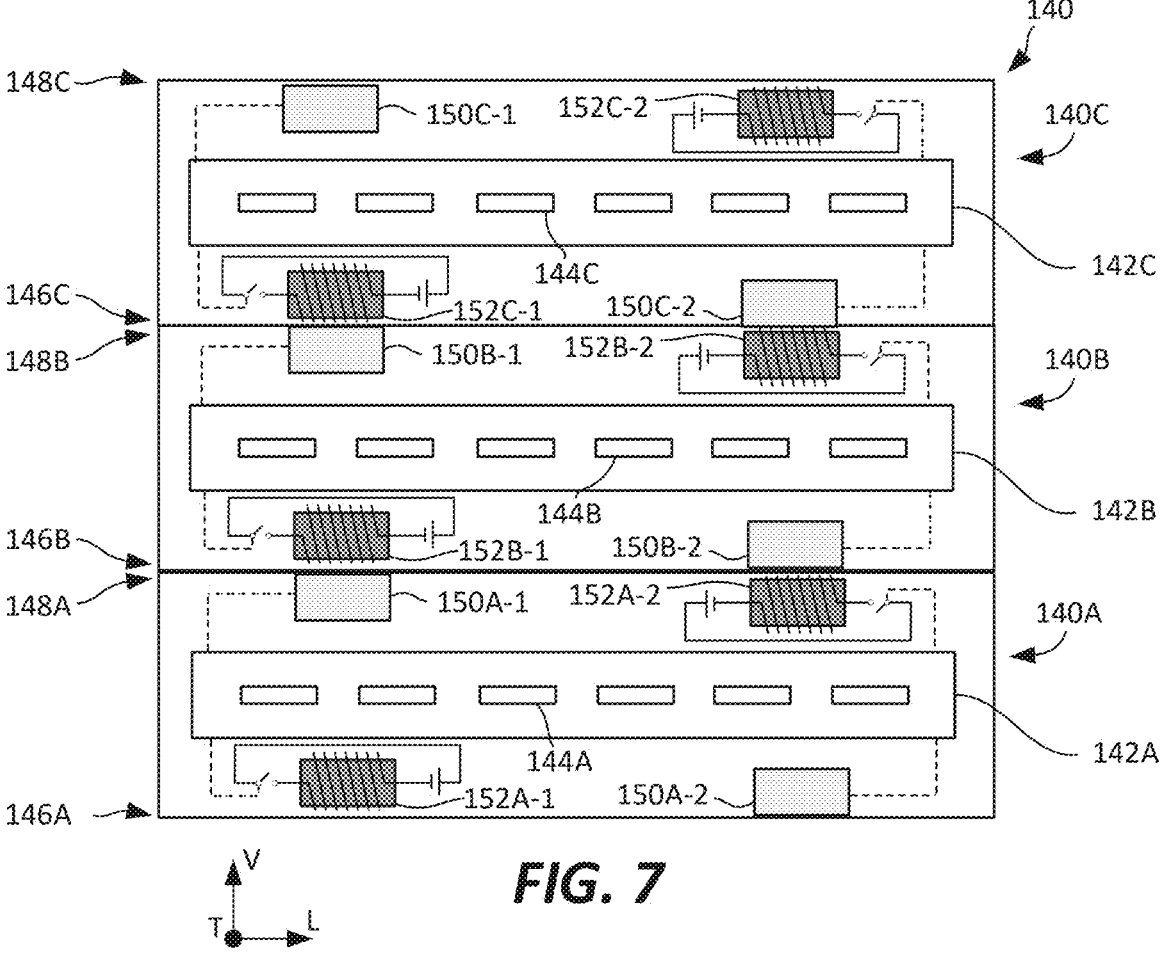
FIGS. 7 through 9 are schematic views of various example embodiments of control boxes arranged in vertical stacks.

FIG. 7 is a schematic view of another example embodiment of a vertically stacked arrangement of control boxes. As depicted, the first control box 140A includes a first side, first magnet 152A-1 and a second side, first magnetic switch 150A-2 both positioned at the first end 146A (or bottom end). The first side, first magnet 152A-1 and the second side, first magnetic switch 150A-2 are spaced from one another, e.g., along the lateral direction L. In this regard, the first side, first magnet 152A-1 is positioned at or proximate a first side of the vertical stack while the second side, first magnetic switch 150A-2 is positioned at or proximate a second side of the vertical stack. The first control box 140A also includes a first side, first magnetic switch 150A-1 and a second side, first magnet 152A-2 both positioned at the second end 148A (or top end). The first side, first magnetic switch 150A-1 and the second side, first magnet 152A-2 are spaced from one another, e.g., along the lateral direction L. Accordingly, the first side, first magnetic switch 150A-1 is positioned at or proximate the first side of the vertical stack while the second side, first magnet 152A-2 is positioned at or proximate the second side of the vertical stack.

The second control box 140B and the third control box 1400 are constructed in a similar manner as the first control box 140A. As illustrated, the second control box 140B includes a first side, second magnet 152B-1 and a second side, second magnetic switch 150B-2 both positioned at the first end 146B (or bottom end). The second control box 140B also includes a first side, second magnetic switch 150B-1 and a second side, second magnet 152B-2 both positioned at the second end 148B (or top end). Similarly, the third control box 140C includes a first side, third magnet 152C-1 and a second side, third magnetic switch 150C-2 both positioned at the first end 146C (or bottom end). The third control box 140C also includes a first side, third magnetic switch 150C-1 and a second side, third magnet 152C-2 both positioned at the second end 148C (or top end).

Generally, the first side column of magnetic switches and magnets (152A-1, 150A-1, 152B-1, 150B-1, 152C-1, and 150C-1) facilitates top-down communication between the control boxes 140 and the second side column of magnetic switches and magnets (150A-2, 152A-2, 150B-2, 152B-2, 150C-2, and 152C-2) facilitates bottom-up communication between the control boxes 140. Such an arrangement can advantageously allow the first, second, and third controllers 142A, 142B, 142C to confirm pulse trains received, such as by providing an acknowledgement to a neighboring control box, as well as to facilitate two-way communication between the control boxes 140 in general.

As one example, the first controller 142A can determine that it is the bottom box of the vertical stack, and accordingly, the first controller 142A can cause the second side, first magnet 152A-2 to be pulsed with electric current according to a first duty cycle. The second side, second magnetic switch 150B-2 can sense the magnetic field (or the pulsed magnetic flux) produced by the second side, first magnet 152A-2. The second controller 142B can recognize or identify the pulse pattern as the first pulse pattern based on the sensed feedback from the second side, second magnetic switch 150B-2. This bottom-up communication can then be confirmed via a top-down communication. In at least one example, the second controller 142B can confirm with the first controller 142A that the second controller 142B sensed a magnetic flux pulse train corresponding to the first duty cycle. Accordingly, the second controller 142B can cause the first side, second magnet 152B-1 to be pulsed with electric current according to a confirmation duty cycle, which can be the same as the first duty cycle, for example. The first side, first magnetic switch 150A-1 can sense the magnetic field (or the pulsed magnetic flux) produced by the first side, second magnet 152B-1. The first controller 142A can recognize or identify the pulse pattern as a pulse pattern corresponding to the confirmation duty cycle, based on the sensed feedback from the first side, first magnetic switch 150A-1. This confirmation technique can continue for each pair of neighboring control boxes of the vertical stack during a detection sequence. It will be appreciated that the unique configuration of the control boxes 140 in FIG. 7 also allows for the detection sequence to work top-down with confirmations being sent bottom-up.

Further, while such two-way communication provided by the arrangement of the control boxes 140 of FIG. 7 can facilitate detection of the positions of the control boxes within the vertical stack during a detection sequence, two-way communication can be implemented or used outside of or not during a detection sequence. In at least one example, each of the first, second, and third controllers 142A, 142B, 142C can store a library of pulse patterns (e.g., in one or more non-transitory memory devices). Each pulse pattern of the library can correspond to a predetermined message. The control boxes 140 of the stacked arrangement can pulse their respective electromagnets according to one of the pulse patterns stored to communicate with other control boxes 140 of the vertical stack, e.g., to communicate errors, irregularities, confirmations, etc.

In some alternative embodiments, the control boxes of a vertical stack can each have a magnet in the form of an electromagnet and a pair of magnetic switches positioned at opposite ends (e.g., one at the top and one at the bottom) of the control box. The direction of current through the coil of the electromagnet can be switched depending on whether top-down communication or bottom-up communication is desired. Such an embodiment allows for both top-down and bottom-up communication between the control boxes of the vertical stack. An example embodiment is provided below.

Figure 8:
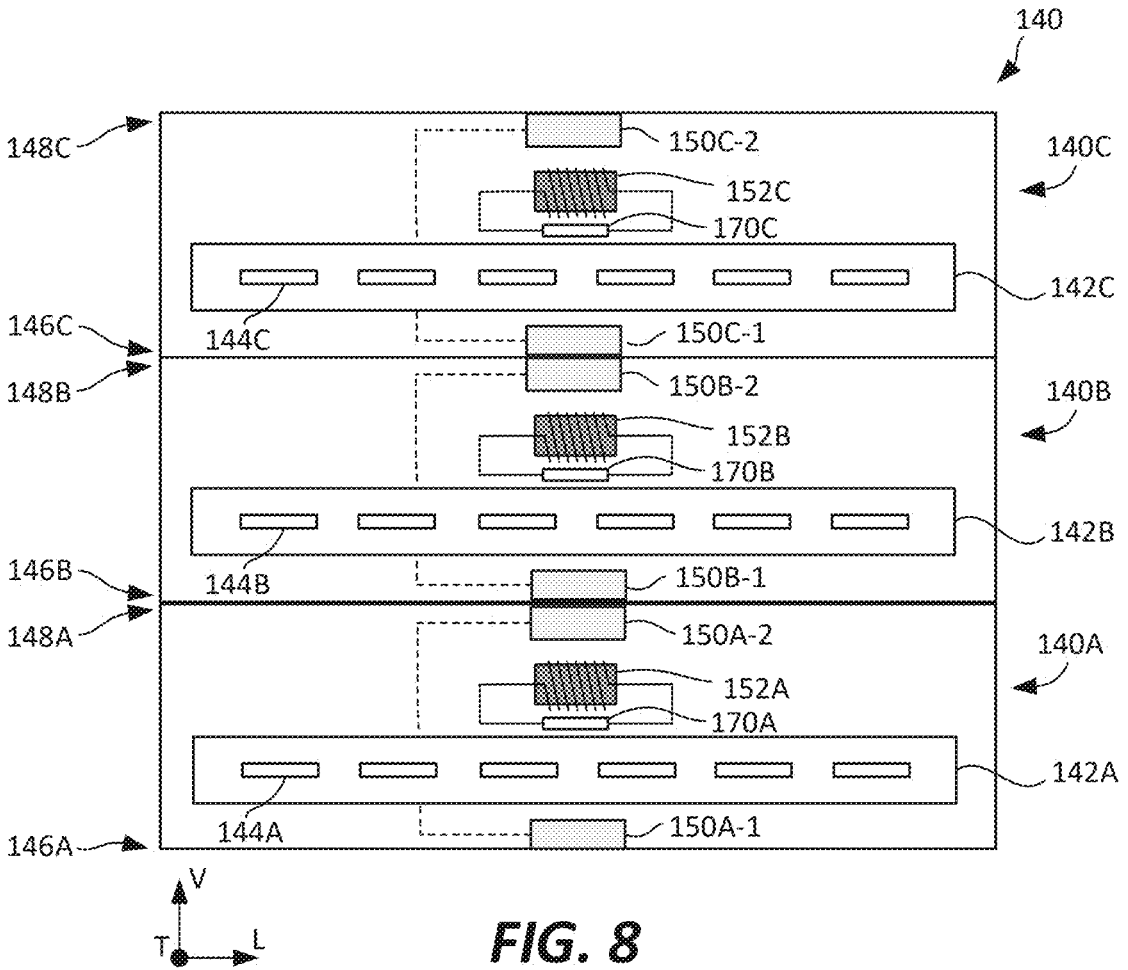

FIG. 8 is a schematic view of yet another example embodiment of a vertically stacked arrangement of control boxes. The stacked arrangement includes the first control box 140A, the second control box 140B, and the third control box 140C.

As depicted, the first control box 140A includes a first end, first magnetic switch 150A-1 and a second end, first magnetic switch 150A-2. The first end, first magnetic switch 150A-1 can be a unipolar magnetic switch that can sense a first polarity magnetic field (e.g., a positive magnetic field). The second end, first magnetic switch 150A-2 can be a unipolar magnetic switch that can sense a second polarity magnetic field (e.g., a negative magnetic field). The first control box 140A also includes the first magnet 152A in the form of an electromagnet. The first magnet 152A, or a coil thereof, is electrically coupled with a first H-bridge circuit 170A that enables a polarity of the power to the coil to be changed, or rather, a direction of the electric current through the coil to changed, e.g., from a first direction to a second direction, or vice versa. The first H-bridge circuit 170A can include a plurality of switches arranged in an "H" configuration. The switches, or combination of switches, can be selectively coupled with a power source. The direction of electric current through the coil of the first magnet 152A can be determined based on the combination of switches selectively coupled with the power source. Based on the direction of electric current through the coil of the first magnet 152A, the electromagnet can produce one or more positive magnetic flux pulses or one or more negative magnetic flux pulses.

The second control box 140B is constructed in a similar manner as the first control box 140A. As illustrated, the second control box 140B includes a first end, second magnetic switch 150B-1 and a second end, second magnetic switch 150B-2. The first end, second magnetic switch 150B-1 can be a unipolar magnetic switch that can sense a first polarity magnetic field (e.g., a positive magnetic field). The second end, second magnetic switch 150B-2 can be a unipolar magnetic switch that can sense a second polarity magnetic field (e.g., a negative magnetic field). The second control box 140B also includes the second magnet 152B in the form of an electromagnet. The second magnet 152B, or a coil thereof, is electrically coupled with a second H-bridge circuit 170B that enables a polarity of the power to the coil to be changed, or rather, a direction of the electric current through the coil to changed, e.g., from a first direction to a second direction, or vice versa. The direction of electric current through the coil of the second magnet 152B can be determined based on a combination of switches of the second H-bridge circuit 170B selectively coupled with a power source. Based on the direction of electric current through the coil of the second magnet 152B, the electromagnet can produce one or more positive magnetic flux pulses or one or more negative magnetic flux pulses.

The third control box 140C is constructed in a similar manner as the first and second control boxes 140A, 140B. As shown, the third control box 140C includes a first end, third magnetic switch 150C-1 and a second end, third magnetic switch 150C-2. The first end, third magnetic switch 150C-1 and the second end, third magnetic switch 150C-2 can both be unipolar magnetic switches, with the first end, third magnetic switch 150C-1 being configured to sense a first polarity magnetic field (e.g., a positive magnetic field) and the second end, third magnetic switch 150C-2 being configured to sense a second polarity magnetic field (e.g., a negative magnetic field). The third control box 140C also includes the third magnet 152C in the form of an electromagnet. The third magnet 152C, or a coil thereof, is electrically coupled with a third H-bridge circuit 170C that enables a polarity of the power to the coil to be changed, or rather, a direction of the electric current through the coil to changed, e.g., from a first direction to a second direction, or vice versa. The direction of electric current through the coil of the third magnet 152C can be determined based on a combination of switches of the third H-bridge circuit 170C selectively coupled with a power source. Based on the direction of electric current through the coil of the third magnet 152C, the electromagnet can produce one or more positive magnetic flux pulses or one or more negative magnetic flux pulses.

Communication from one control box to another can be directed in a top-down direction or in a bottom-up direction based on a direction of electric current through the coil of the electromagnet of the communicating control box. For instance, the second control box 140B, which is arranged as the middle box in the vertical stack of FIG. 8, can communicate in a top-down direction to the first control box 140A. In at least one example, the second controller 142B can cause the second H-bridge circuit 170B of the second control box 140B to direct current through the coil of the second magnet 152B so that a magnetic field is produced having a polarity that can be sensed by the second end, first magnetic switch 150A-2 of the first control box 140A. The first end, second magnetic switch 150B-1 is configured to sense a predefined polarity so as not to "trip" when the second magnet 152B produces a magnetic field having a polarity that can be sensed by the second end, first magnetic switch 150A-2. Electric current can be pulsed through the coil of the second magnet 152B according to a predetermined duty cycle, which can be known to the first controller 142A. In this way, top-down communication can be achieved between the second controller 142B and the first controller 142A.

The second control box 140B, which is arranged as the middle box in the vertical stack of FIG. 8, can communicate in a bottom-up direction to the third control box 140C. In at least one example, the second controller 142B can cause the second H-bridge circuit 170B of the second control box 140B to direct current through the coil of the second magnet 152B (in a direction opposite the current flow when communicating with the first control box 140A) so that a magnetic field is produced having a polarity that can be sensed by the first end, third magnetic switch 150C-1 of the third control box 140C. The second end, second magnetic switch 150B-2 is configured to sense a predefined polarity so as not to "trip" when the second magnet 152B produces a magnetic field having a polarity that can be sensed by the first end, third magnetic switch 150C-1. Electric current can be pulsed through the coil of the second magnet 152B according to a predetermined duty cycle, which can be known to the third controller 142C. In this way, bottom-up communication can be achieved between the second controller 142B and the third controller 142C.

The first and third control boxes 140A, 140C can communicate top-down and bottom-up in a similar manner as described above with respect to the second control box 140B. Two-way communication between the control boxes 140 of FIG. 8 can be used during a detection sequence, e.g., so that the control boxes 140 can determine their respective positions within the vertical stack, but can also be implemented outside of or not during a detection sequence. In at least one example, each of the first, second, and third controllers 142A, 142B, 142C can store a library of pulse patterns (e.g., in one or more non-transitory memory devices). Each pulse pattern of the library can correspond to a predetermined message. The control boxes 140 of the stacked arrangement can pulse their respective electromagnets according to one of the pulse patterns stored to communicate with other control boxes 140 of the vertical stack, e.g., to communicate errors, irregularities, confirmations, etc.

In some additional embodiments, the control boxes of a vertical stack can each have a detector at their respective first ends (e.g., bottom ends) and an emitter at their respective second ends (e.g., top ends). The emitters can be optical emitters and the detectors can be photodetectors, for example. The emitters can emit optical signals that can be sensed by a photodetector of a neighboring control box, for example. In some example embodiments, the optical emitter can be an Infrared (IR) emitter and the photodetector can be an IR sensor. An example embodiment is provided below.

Figure 9:
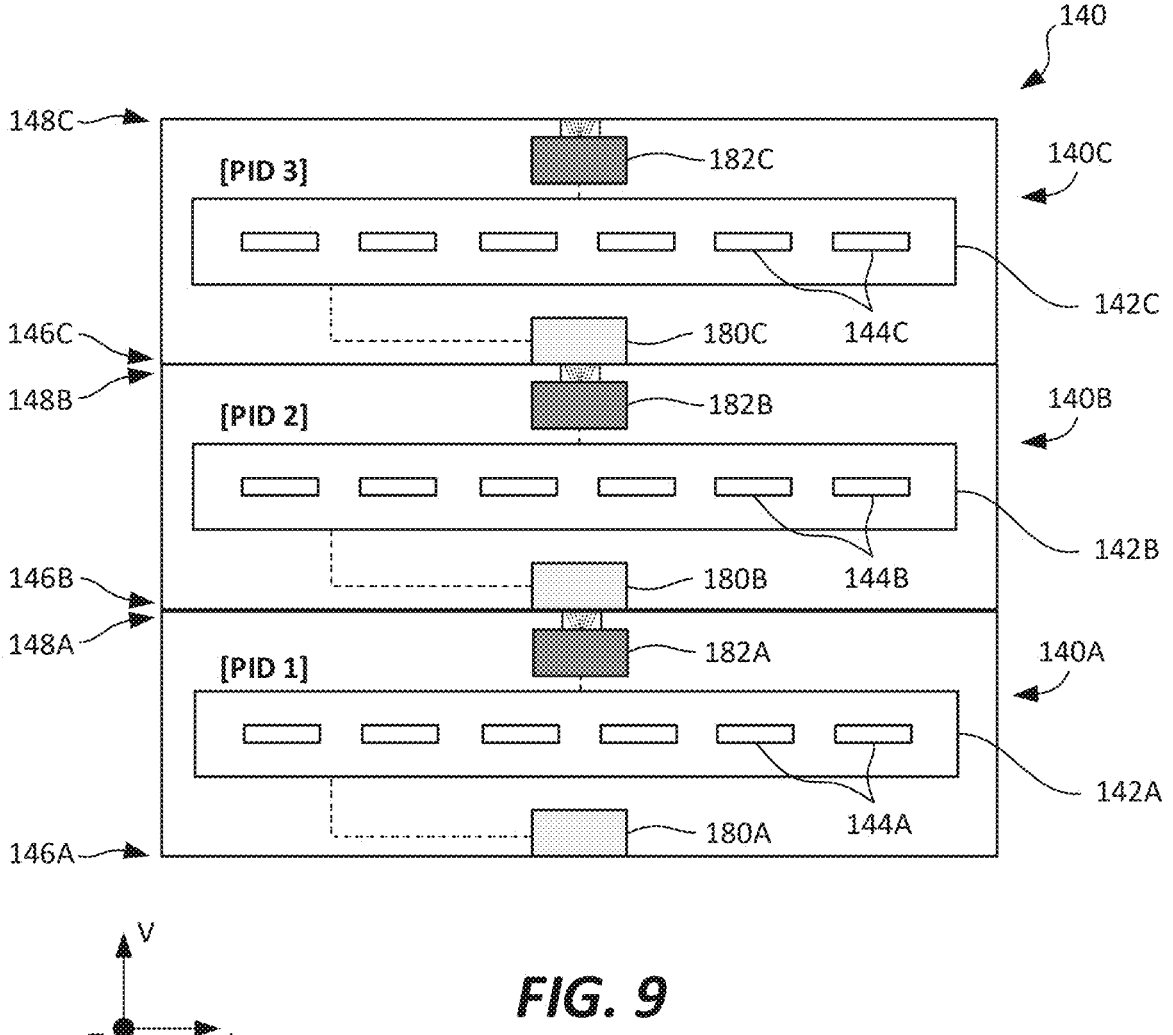

FIG. 9 is a schematic view of another example embodiment of a vertically stacked arrangement of control boxes 140. For the depicted embodiment of FIG. 9, the second control box 140B is stacked on top of the first control box 140A and the third control box 140C is stacked on top of the second control box 140B.

As shown, in addition to the first controller 142A, the first control box 140A includes a first detector 180A and a first emitter 182A. The first detector 180A is disposed at the first end 146A while the first emitter 182A is disposed at the second end 148A of the first control box 140A. The first detector 180A can be a photodetector configured to sense optical signals, e.g., from a neighboring control box. The first emitter 182A can be an optical emitter configured to emit optical signals. The first emitter 182A can emit optical signals through a window or opening in the first control box 140A.

The second and third control boxes 140B, 140C are configured in a similar manner as the first control box 140A. As illustrated, the second control box 140B includes a second detector 180B and a second emitter 182B. The second detector 180B is disposed at the first end 146B while the second emitter 182B is disposed at the second end 148B of the second control box 140B. The second detector 180B can be a photodetector configured to sense optical signals, e.g., from a neighboring control box. The second emitter 182B can be an optical emitter configured to emit optical signals. The second emitter 182B can emit optical signals through a window or opening in the second control box 140B. Similarly, the third control box 140C includes a third detector 180C and a third emitter 182C. The third detector 180C is disposed at the first end 146C while the third emitter 182C is disposed at the second end 148C of the third control box 140C. The third detector 1800 can be a photodetector configured to sense optical signals, e.g., from a neighboring control box. The third emitter 182C can be an optical emitter configured to emit optical signals. The third emitter 182C can emit optical signals through a window or opening in the third control box 140C.

In implementing a detection sequence for the vertical stack of FIG. 9, which can be commenced by the first controller 142A, the second controller 142B, the third controller 142C, or some other computing device (e.g., the computing device 114 of FIG. 1), the first, second, and third controllers 142A, 142B, 142C can determine their respective positions within the vertical stack. For instance, the first controller 142A can determine or receive an input indicating that the first detector 180A is not or has not received an optical signal, and accordingly, the first controller 142A can determine that the first control box 140A is the bottom control box of the vertical stack. The second controller 142B can determine or receive an input indicating that the second detector 180B senses an optical signal (e.g., emitted by the first emitter 182A of the first control box 140A), and accordingly, the second controller 142B can determine that the second control box 140B is not the bottom control box of the vertical stack. The optical signal emitted from the first emitter 182A can contain data indicating that its control box, the first control box 140A, is the bottom box, and consequently, the second controller 142B can determine that the second control box 140B is the second control box from the bottom of the vertical stack.

Upon the second controller 142B determining that the second control box 140B is the second control box from the bottom of the vertical stack, the second controller 142B can cause the second emitter 182B to emit an optical signal. The optical signal can contain data indicating that its control box, the second control box 140B, is the second box from the bottom of the vertical stack. When the second emitter 182B emits the optical signal, the third detector 180C can sense the optical signal. The third controller 142C can determine or receive an input indicating that the third detector 180C senses the optical signal emitted by the second emitter 182B, and based on the data contained in the optical signal, the third controller 142C can determine that the third control box 140C is the third control box from the bottom of the vertical stack.

If the number of boxes in the vertical stack is unknown to the controllers of the control boxes 140, the third controller 142C can cause the third emitter 182C to emit an optical signal, e.g., that contains data indicating that its control box, the third control box 140C, is the third box from the bottom of the vertical stack. In the depicted embodiment of FIG. 9, there is no control box stacked on the third control box 140C; thus, the optical signal emitted by the third emitter 182C is not sensed by a detector of a neighboring control box stacked thereon. If the number of boxes in the vertical stack is known to the controllers of the control boxes 140, then the third controller 142C does not have to cause the third emitter 182C to emit an optical signal.

Once the positions of the control boxes within the vertical stack are determined, the first, second, and third controllers 142A, 142B, 142C can be configured. For example, one or more of the first, second, and third controllers 142A, 142B, 142C can self-configure. As another example, one or more of the first, second, and third controllers 142A, 142B, 142C can communicate their respective positions to another computing device, such as the computing device 114 of FIG. 1, and such a computing device can configure the first, second, and third controllers 142A, 142B, 142C, e.g., so that the bottom box of the vertical stack as a first product ID (PID1), the middle box has a second product ID (PID2), and the top box has a third product ID (PID3). In this way, for example, the ports of the first, second, and third controllers 142A, 142B, 142C can be assigned to the correct loads cells.

Figure 10:
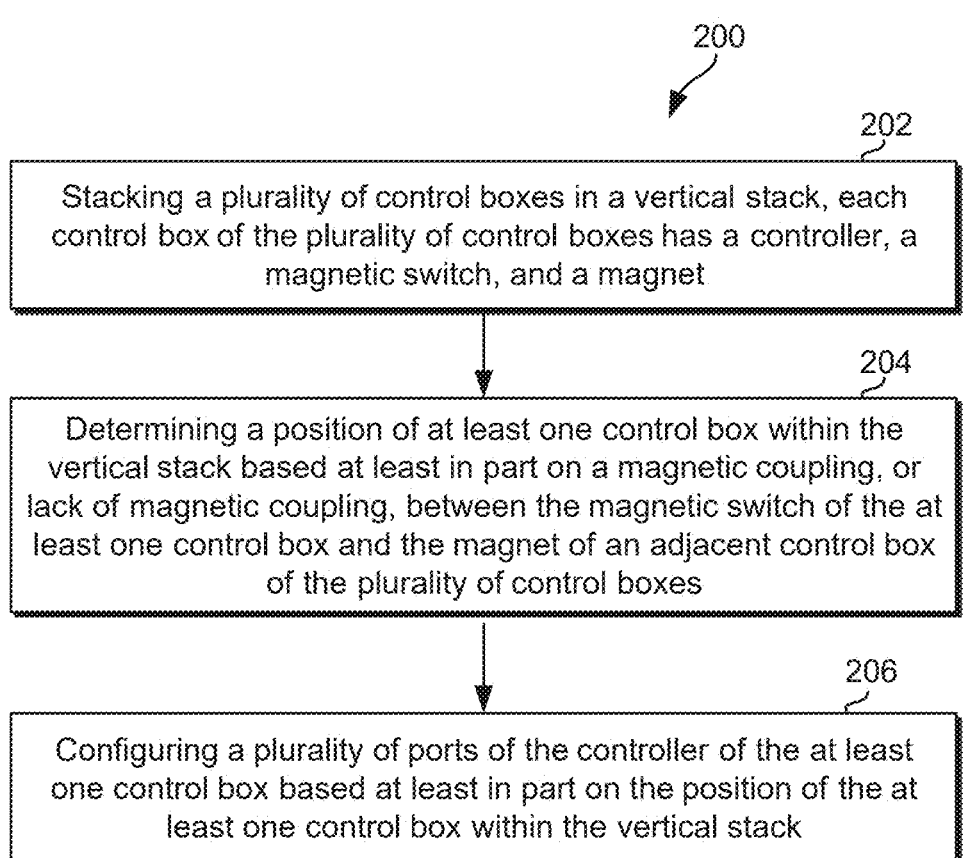
FIG. 10 is a flow diagram of one example method of implementing a detection sequence in accordance with various aspects as described herein.

FIG. 10 is a flow diagram for a method 200 of implementing a detection sequence for determining positions of control boxes within a vertical stack in accordance with various aspects described herein.

At 202, the method 200 can include stacking a plurality of control boxes in a vertical stack, each control box of the plurality of control boxes has a controller, a magnetic switch, and a magnet. For instance, the plurality of control boxes can include a first control box stacked on a second control box, or vice versa. Each controller can include a controller having a plurality of ports, with each port being configured to be communicatively coupled with a corresponding load cell, e.g., of a checkout terminal or system. Each control box can include at least one magnet, which can be a permanent magnet or an electromagnet. Each control box also includes a magnetic switch, such as a reed switch.

At 204, the method 200 can include determining a position of at least one control box within the vertical stack based at least in part on a magnetic coupling, or lack of magnetic coupling, between the magnetic switch of the at least one control box and the magnet of an adjacent control box of the plurality of control boxes. For instance, the first control box can be stacked on top of the second control box. The magnetic switch of the second control box, which can be disposed at a bottom end of the second control box, can sense that no magnetic field is present, e.g., because the second control box is the bottom box of the vertical stack. Thus, based on the lack of magnetic coupling, the controller of the second control box can determine that the second control box is the bottom box of the vertical stack. In this regard, the second controller can determine the position of the second control box within the vertical stack based at least in part on a lack of magnetic coupling of the magnetic switch of the second control box with a magnet of an adjacent control box.

The first controller, however, can receive an input from its magnetic switch that it has detected the presence of a magnetic field. Accordingly, the controller of the first control box can determined that the first control box is not the bottom box of the vertical stack, and depending on other known information, the controller of the first control box may be able to determine that it is the top box of the vertical stack.

In some implementations, the magnet of the second control box that is magnetically coupled with the magnetic switch of the first control box is an electromagnet. In such implementations, the controller of the first control box can identify a predefined pulse pattern used to pulse the electromagnet of the adjacent control box (the second control box in this example), and accordingly, the position of the first control box can be determined based at least in part on the predefined pulse pattern identified. The predefined pulse pattern can be known to controller of the first control box and the predefined pulse pattern can correspond to the position of the adjacent control box (the second control box in this example), which enables the controller of the first control box to infer or determine its own position within the vertical stack.

In some implementations, the first controller can cause an acknowledgement to be sent to the controller associated with the magnet that was pulsed with the predefined pulse pattern (or the controller of the second control box in this example). For instance, the control boxes can be configured as in FIG. 7 or FIG. 8, and accordingly, two-way communication can be implemented, such as to send an acknowledgement to the controller of the second controller confirming that the controller of the first control box received the predefined pulse pattern.

At 206, the method 200 can include configuring a plurality of ports of the controller of the at least one control box based at least in part on the position of the at least one control box within the vertical stack. For instance, the controller of each control box can self-configure its ports based on the positions of their respective control boxes within the vertical stack. For instance, the controller of the bottom box of the vertical stack can configure itself with a first product identification associated with a first set of load cells and the controller of top box of the vertical stack can configure itself with a second product identification associated with a second set of load cells. In other implementations, the controllers can report their positions to a host computer, which can configure the ports of the controllers. In yet other implementations, the controllers of the control boxes can be configured using a combination of self-configuration and a host computer. With implementation of the detection sequence of method 200, the ports of the controllers can be configured to the correct set of load cells, regardless of whether the controllers are arranged in the vertical stack according to a predetermined order.

Although the embodiments disclosed herein are presented in the context of a vertical stack, the teachings of the present disclosure are also applicable to control boxes arranged in a horizontal stack, or a side-by-side configuration.

Figure 11:
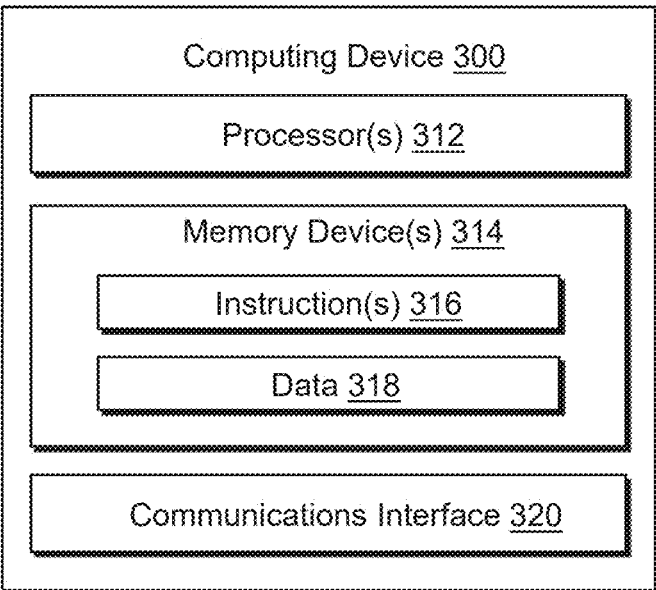
FIG. 11 is a block diagram of an example computing device in accordance with various aspects as described herein.

FIG. 11 is a block diagram of an example computing device 300 in accordance with various aspects as described herein. The computing device 114 or any one of the controllers 142A, 142B, 142C described herein can be configured in a same or similar manner as the computing device 300 of FIG. 11.

As shown in FIG. 11, the computing device 300 can include one or more processor(s) 312 and one or more memory device(s) 314. The one or more processor(s) 312 can include any suitable processing device, such as a microprocessor, microcontroller, integrated circuit, logic device, or other suitable processing device. The one or more memory device(s) 314 can include one or more computer-readable medium, including, but not limited to, non-transitory computer-readable medium, RAM, ROM, hard drives, flash drives, and other memory devices.

The one or more memory device(s) 314 can store information accessible by the one or more processor(s) 312, including computer-readable instructions 316 or computer-readable program code that can be executed by the one or more processor(s) 312. The instructions 316 can be any set of instructions that when executed by the one or more processor(s) 312, cause the one or more processor(s) 312 to perform operations. The instructions 316 can be software written in any suitable programming language or can be implemented in hardware.

The memory device(s) 314 can further store data 318 that can be accessed by the processors 312. For example, the data 318 can include any of the data noted herein. The data 318 can include one or more table(s), function(s), algorithm(s), model(s), equation(s), libraries, etc. according to example aspects of the present disclosure.

The computing device 300 can also include a communication interface 320 used to communicate, for example, with the other components of the checkout terminal. The communication interface 320 can include any suitable components for interfacing with one or more network(s), including for example, transmitters, receivers, ports, controllers, antennas, or other suitable components.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim (s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of example computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a given manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A system, comprising:
   a plurality of control boxes, each comprising:
      a controller having a plurality of ports;
      a magnetic switch; and
      a magnet, and
      wherein the plurality of control boxes is arranged in a stack so that, for each adjacent pair of control boxes, the magnetic switch of one control box is magnetically coupled with the magnet of another control box, and
      wherein the controller of each one of the plurality of control boxes is configured to determine a position, within the stack, of the control box in which the controller is positioned based at least in part on the magnetic coupling, or lack of magnetic coupling, between the magnetic switch of the control box in which the controller is positioned and the magnet of another control box of the plurality of control boxes.

2. The system of claim 1, wherein the plurality of ports of the controller of each one of the plurality of control boxes is configured with a set of load cells according to the position, within the stack, of the control box in which the controller is positioned.

3. The system of claim 1, wherein the controller of each one of the plurality of control boxes is arranged to self-configure the plurality of ports associated therewith according to the position, within the stack, of the control box in which the controller is positioned.

4. The system of claim 1, wherein each control box of the plurality of control boxes has a first end and a second end, and wherein each one of the plurality of control boxes is arranged so that, for a given control box of the plurality of control boxes, the magnetic switch thereof is disposed at the first end and the magnet is disposed at the second end thereof.

5. The system of claim 4, wherein the first end is a top and the second end is a bottom or the first end is a bottom and the second end is a top.

6. The system of claim 1, wherein the magnetic switch of one control box of the plurality of control boxes is not magnetically coupled with the magnet of another one of the plurality of control boxes.

7. The system of claim 1, wherein the magnet of each one of the plurality of control boxes is a permanent magnet.

8. The system of claim 1, wherein the magnet of each one of the plurality of control boxes is an electromagnet.

9. The system of claim 8, wherein the electromagnet of at least one of the plurality of control boxes is pulsed with electric current according to a predefined pulse pattern that is known to the controller of an adjacent box of the plurality of control boxes.

10. The system of claim 9, wherein the controller of the adjacent box configures the plurality of ports of the controller of the adjacent box based at least in part on identification of the predefined pulse pattern used to pulse the electromagnet of the at least one of the plurality of control boxes.

11. The system of claim 9, wherein the electromagnets of at least two of the plurality of control boxes are pulsed with electric current according to different predefined pulse patterns.

12. The system of claim 8, wherein the plurality of control boxes includes a first control box and a second control box, and wherein:

the controller of the first control box is configured to, upon determining the position of the first control box based on feedback from the magnetic switch of the first control box, cause the electromagnet to be pulsed according to a first predefined pulse pattern, which indicates the position of the first control box within the stack, and the controller of the second control box is configured to determine a position of the second control box within the stack based at least in part on input received from the magnetic switch magnetically coupled with the electromagnet of the first control box, the input indicating that the electromagnet of the first control box was pulsed according to the first predefined pulse pattern.

13. The system of claim 12, wherein the controller of the second control box is configured to, upon determining the position of the second control box within the stack, cause the electromagnet to be pulsed according to a second predefined pulse pattern, which indicates the position of the second control box within the stack.

14. The system of claim 1, each one of the plurality of control boxes includes a first column and a second column, the first column includes the magnet and the magnetic switch and the second column includes a second magnet and a second magnetic switch, and wherein communication is operable between first columns of adjacent control boxes of the plurality of control boxes in a first direction and communication is operable between second columns of adjacent control boxes of the plurality of control boxes in a second direction opposite the first direction.

15. The system of claim 1, wherein the magnetic switch of each one of the plurality of control boxes is a first magnetic switch and the magnet is an electromagnet, and wherein each one of the plurality of control boxes includes a second magnetic switch, the first magnetic switch and the second magnetic switch being disposed on opposite sides of the electromagnet, and wherein electric current is directed through the electromagnet in a first direction or a second direction depending on a direction of communication between the control boxes of the plurality of control boxes within the stack.

16. A method, comprising:

stacking a plurality of control boxes in a stack, each control box of the plurality of control boxes has a controller, a magnetic switch, and a magnet; and determining a position of at least one control box within the stack based at least in part on a magnetic coupling, or lack of magnetic coupling, between the magnetic switch of the at least one control box and the magnet of an adjacent control box of the plurality of control boxes.

17. The method of claim 16, further comprising:

configuring a plurality of ports of the controller of the at least one control box based at least in part on the position of the at least one control box within the stack.

18. The method of claim 16, wherein determining the position of the at least one control box within the stack based at least in part on the magnetic coupling, or lack of magnetic coupling, between the magnetic switch of the at least one control box and the magnet of the adjacent control box of the plurality of control boxes comprises:

identifying, by the controller of the at least one control box, a predefined pulse pattern used to pulse the magnet of the adjacent control box, and wherein the position of the at least one control box is determined based at least in part on the predefined pulse pattern identified.

19. The method of claim 18, further comprising:

causing, by the controller of the at least one control box, an acknowledgement to be sent to the controller associated with the magnet that was pulsed with the predefined pulse pattern.

20. A computer program product, comprising:

a non-transitory computer-readable storage medium having computer-readable program code embodied therewith, the computer-readable program code executable by one or more computer processors to:

determine a position of at least one control box of a plurality of control boxes within a stack based at least in part on a magnetic coupling, or lack of magnetic coupling, between a magnetic switch of the at least one control box and the magnet of an adjacent control box of the plurality of control boxes; and configure a plurality of ports of the controller of the at least one control box based at least in part on the position of the at least one control box within the stack.

\* \* \* \* \*